United States Patent
Messing

(10) Patent No.: US 6,745,327 B1
(45) Date of Patent: Jun. 1, 2004

(54) ELECTRONIC CERTIFICATE SIGNATURE PROGRAM

(76) Inventor: John H. Messing, 3900 E. Broadway Blvd., Suite 201, Tucson, AZ (US) 85711

( * ) Notice: Subject to any disclaimer, the term of this patent is extended or adjusted under 35 U.S.C. 154(b) by 0 days.

(21) Appl. No.: 09/244,243

(22) Filed: Feb. 3, 1999

Related U.S. Application Data

(63) Continuation-in-part of application No. 09/081,872, filed on May 20, 1998.

(51) Int. Cl.⁷ .............................. H04L 9/32; G06F 12/14
(52) U.S. Cl. ..................... 713/170; 713/156; 713/157; 713/175; 713/176; 713/182; 713/185
(58) Field of Search .................................. 713/156, 157, 713/159, 168, 170, 173, 175, 176, 182, 178, 181, 183, 184, 185, 186; 705/51, 64, 65, 67, 68, 69, 39

(56) References Cited

U.S. PATENT DOCUMENTS

| | | | |
|---|---|---|---|
| 4,405,829 A | | 9/1983 | Rivest et al. ............... 178/22.1 |
| 5,231,668 A | | 7/1993 | Kravitz ......................... 380/28 |
| 5,465,299 A | * | 11/1995 | Matsumoto et al. .......... 380/23 |
| 5,588,061 A | | 12/1996 | Ganesan et al. .............. 380/30 |
| 5,613,012 A | | 3/1997 | Hoffman et al. ............ 382/115 |
| 5,647,017 A | | 7/1997 | Smithies et al. ............ 382/115 |
| 5,659,616 A | * | 8/1997 | Sudia ........................... 380/23 |
| 5,689,567 A | | 11/1997 | Miyauchi ..................... 380/25 |
| 5,862,223 A | * | 1/1999 | Walker et al. ................ 380/25 |
| 6,029,150 A | * | 2/2000 | Kravitz ......................... 705/39 |
| 6,175,921 B1 | * | 1/2001 | Rosen ......................... 713/173 |
| 6,237,096 B1 | * | 5/2001 | Bisbee et al. ................. 705/51 |
| 6,247,644 B1 | * | 6/2001 | Horne et al. ................ 235/380 |
| 6,253,322 B1 | * | 6/2001 | Susaki et al. ............... 713/170 |
| 6,408,336 B1 | * | 6/2002 | Schneider et al. .......... 709/229 |

FOREIGN PATENT DOCUMENTS

| | | | |
|---|---|---|---|
| GB | 2237672 A | * 5/1991 | ........... A61B/5/117 |

OTHER PUBLICATIONS

Baum and Ford, Secure Electronic Commerce (1997), pp. 319–321, 330–3 and accompanying endnote 35 at p. 352.

Newman and Smithies, "Questioned *Electronic* Document Examination", PenOp & American Academy of Forensic Sciences (Feb. 1997), pp. 1–8.

Benjamin Wright, "The Legality of the PenOp® Signature", Pen Op (1994) pp. 1–8.

Gail L. Grant, "Digital Signature Technology", *Understanding Digital Signatures* (McGraw Hill 1998), Appendix II, pp. 235–243.

Cotter and Messing, "Electronic Court Filing in the Pima County Small Claims Court—Technical Parameters, Adopted Solutions and Some of the Legal Issues Involved," 38 Jurimetrics J. 397–406 (1998).

\* cited by examiner

*Primary Examiner*—Justin T. Darrow

(57) ABSTRACT

An electronic certificate signature program to create electronic signatures for documents, filings, and commercial transactions effectuated over the Internet, other computer networks or by other transmission means. A digital certificate is issued to a computer user after a personal identity verification. The personalized digital certificate may include biometric data, such as a photograph, a retinal scan, a voice print, a fingerprint, a handwriting exemplar, or other biologically derived data, and a date and time stamp, all of which is digitally signed using the private key of the issuing computer. If a hardware token is employed to house the certificate, some or all of the biometric data is printed on the exterior. A digital signature is effectuated using a network computer's private key. A user presents the digital certificate and enters a unique passphrase or other identifying secret to gain access. The signature on the electronic document or data incorporates certain of the certificate information and a date and time stamp. This method positively authenticates the user. Multiple users may share the same private key of a network computer using this method. Individual private signature keys are not employed.

4 Claims, 4 Drawing Sheets

ELECTRONIC CERTIFICATE SIGNATURE PROGRAM

CROSS REFERENCES TO RELATED APPLICATIONS

This is a continuation in part of Ser. No. 09/081,872 filed May 20, 1998

BACKGROUND

1. Field of Invention

This invention allows multiple users to access a single signature device located on a central network computer by typing a unique passphrase known only to the individual user and presenting a digital certificate that contains personal data about the individual user and to sign using the certificate information which is also incorporated into the signature itself as a way to authenticate the user in connection with the signed electronic document or data.

2. Description of Prior Art

The dominant technology under prior art for individuals to sign electronic documents and transaction data is based upon client-side digital signatures. The signatures are created by software that uses an encryption algorithm, called a private key, of the user to electronically encode the electronic document or transaction data. A mathematically related algorithm, called the public key corresponds to the private signature key. The public key is used by the recipient to verify the authenticity of the electronic document or data and the integrity of the data since signing occurred, including the fact that it has not been changed or altered since the signature was affixed. Digital certificates issued by trusted third parties called certification authorities identify public keys of the presumptive true owners of the private keys that were used for signing, thus assuring that the signer is in fact the person who purported to sign the document or data.

An example of a system of digital signatures is shown in U.S. Pat. No. 4,405,829 to Rivest et al. (1983). It is based upon a technology commonly referred to as "asymmetric encryption." In this technology, a user generates two mathematically related numbers based upon prime numbers, called keys. The so-called private key remains with the issuing user. It is kept secret. The other key, denominated the public key, can be freely distributed by the issuer to others. The keys are related, but they are not identical. They perform reverse roles. One is used to encrypt information, and the other to decrypt it. With respect to signatures, one key affixes the signature and other is used to verify it and the electronic document contents.

Electronic communications are signed, generally with the private key, in a two step process. First a digest of a message is created with a one way hash function, and then the hash function is encrypted using the private key. The authenticity of the message and its contents can be verified by a recipient as being authentic and sent from the signing party by testing the message using the public key. An altered message or fraudulent sender will be detected by a computer possessing the proper software and the public key. If either the message has been altered since signing or alternatively the signer did not use the proper private key, the signature will be reported as false or inauthentic. This method is useful for electronic authentication.

However, to the extent that this method of authentication occurs using individual desktop or laptop computers that are identified to others through a system of digital certificates, it also requires a massive infrastructure for key management and verification by trusted third parties, called certification authorities. These certification authorities verify the identities of individual key holders before issuing certificates to them. Once identity is confirmed, they sign the public key of the individual with the certification authority's private key. They also allow others to verify that the public key of the key pair belongs to the party who is identified as the holder of the key pair, and maintain lists of active and revoked certificates for use by third parties that rely upon the certificates to prove identity. Authentication by a relying party requires not only a check of the digital signature on the message, but also of the status of the certificate identifying the signer, to make sure that it is still valid. This involves accessing the certificate authority computer and checking its lists of revoked and suspended certificates. The investment to create and operate a commercial or large enterprise-wide certification authority is considerable. Legal requirements of periodic audits impose other costs.

The digital certificates from certification authorities identify the owner of the key pair principally through the owner's public key that was signed by the certification authority at the time of issue. No other identification is made part of the certificate—no picture identification, fingerprint identification, handwriting exemplar, voice print, finger print, retinal scan, or other additional proof in the certificate of the owner's personal identity. Without such other proof as part of the certificate itself, there is no personal identification of the owner to protect the certificate from subsequent wrongful use. An identity check is performed by the certification authority at the time that the public key is signed, but not afterwards. This makes it possible for an unauthorized person who comes into possession of the private key and the certificate of another to claim the identity of the true owner for purposes of one or more transactions over the Internet. The assumed identity can continue until the wrongful use is discovered and the certificate is revoked by the certification authority. Under the laws of many states, the true owner could be bound to a transaction involving wrongful certificate use up to the moment of certificate revocation because there is no other proof of identity needed or required to complete a transaction other than possession of the private key that corresponds to the public key which was signed by the certification authority. This risk is usually placed upon the key owner by contractual agreement, governing law, or custom, and may be protected against by insurance or warranty coverage.

Obtaining possession of the private key without authorization of the owner is not impossible using currently available technology. Private keys left on the hard drive of the owner's computer are subject to various computer attacks. Because the true owner gains access to the private key on the computer's hard drive generally using an unencrypted password, anyone who can learn or decipher this password has equal access. A password can be deciphered through a brute force dictionary attack. All possible permutations and combinations are generated electronically on another computer until the proper password is reconstructed. Generally, there is no check on the number of failed attempts to access the password, the public key or logging device built into the software.

One additional precaution that can be taken in light of this weakness is to store the private keys not on the computer hard drive, but on a card, called a smart card, which is read via a computer peripheral device. The card is inserted into the peripheral device only at the time of signature and is removed immediately thereafter. By keeping the key on the card and in the possession of all times of the owner, the security deficiency caused by leaving the key on the hard drive is corrected, but that is not the end of the matter. The smart cards themselves are subject to being stolen from the person of the owner, and there have been a number of successful attacks on smart cards in which the private key has been extracted in laboratory tests that simulate attacks by sophisticated computer hackers.

A certification authority infrastructure requires a massive investment in equipment and personnel that results in a relatively high cost to the user. The certification authority keeps track of the current status of the public keys that have been signed by it. Each public key corresponds to a private key that may be employed on the client computer for signature purposes.

The system is also particularly awkward for business enterprises. In the event of the compromise of a private key of an employee, all correspondents, including customers, must be alerted and replace that employee's public key with a new one, which may be viewed as an annoyance or bother inappropriate for a business context. When employees leave, the employee certificates that were issued by a certification authority on behalf of the enterprise must also be revoked so that the authority contained in the certificate is no longer valid.

On a broader scale, because the integrity of the entire system of this prior art rests upon the security of the certification authority, if the private key of a commercial certification authority is ever compromised, all certificates issued by it are suspect, and a massive undertaking to replace all keys and certificates of users or certification authorities lower in the certification chain of trust is required.

Furthermore, unless suitable means are adopted by the certification authority to verify the true identity of a holder of a private key in the first place, the claimed security of all subsequent transactions involving the issued certificate is questionable. If less than thorough identity checks are initially made, the true identity of the key holder may be in doubt. As of the date of this application, there is no agreed upon legal procedure or standard for certification authorities, their agents, or registration authorities affiliated with the certification authorities to follow in making initial identity checks for purposes of issuing digital certificates to computer users.

Certificates intentionally have a limited life-span. At the end of the cycle, if the private key has not already been compromised, a new certificate is required. This is done for security reasons. As a result of this practice, real-time checking of the validity of the corresponding digital certificate from the certification authority is necessary, to make sure the certificate is still valid at the time of signing. Thus, the prior art creates a need for continuous communications between users and their certification authorities. This need can create enormous network traffic and bandwidth usage as significant numbers of transactions take place.

There are also significant liability issues which can arise from the need for prompt notice to potential relying third parties from the certification authority of compromised or revoked certificates. If such notice is not correctly given, a third party who relies upon a compromised private key may have a legal cause of action against the responsible certification authority for damages, costs and attorney's fees incurred. This liability cannot be limited by contract in certain jurisdictions.

Furthermore, in business and legal settings where both parties are required to electronically sign documents, filings or transaction records using their respective private keys and digital certificates, and they are located in or claim citizenship of different legal jurisdictions or countries there is a possibility for uncertainty or actual conflict in the various laws that theoretically are applicable to the transaction. In some countries, users may be required to give copies of the private keys to the applicable governmental authority upon pain of punishment. This requirement may compromise the privacy and security of the electronic signatures. Where different legal regimes are involved, such uncertainty or conflict may actually impede the use of the electronic signatures for fear of participants of legal attacks by overzealous authorities or corrupt ones, depending on the reputations of the countries involved and their respective political regimes.

A widespread proliferation of private keys among individual computer users for electronic commerce is a basic tenet of the prior art. This creation and dispersion of private keys creates an administrative and legal tangle for those charged with keeping track of the corresponding public keys and the certificates which prove ownership of them.

So long as the private key of the individual gives practically unrestricted power to bind the individual to a transaction, there will be a temptation among hackers and others to gain unauthorized control of one or more individual's private keys. Once in their possession, the unauthorized users may be able successfully to utilize the private key of the true owner for any purpose, because the private key and digital certificate associated with the corresponding public key are the presumptive indicia of personal identity.

Another example of prior art, PenOp, U.S. Pat. No. 5,544,255(1994), and continuation Ser. No. 298,991, U.S. Pat. No. 5,647,017 (1997) and related patents cited therein, adopts a completely different approach to electronic signatures. It uses a digital drawing tablet as a basis for digitally capturing the characteristics across the drawing tablet of a handwritten signature in addition to the image of the signature itself. In certain applications, the software identifies the characteristic dynamic movements of the writer's hand across the tablet during repeated signature creation and stores them as a template which identifies the common signature characteristics of the series of such signatures. This stored information is later used for comparison purposes to identify a subsequently generated signature as authentic.

If a hash function is also used, digested, and linked to the signature, this approach, like the "digital signature" approach of the "asymmetric encryption" can also determine whether any changes have been made to the document since the signature was applied.

This "signature dynamics" approach may avoid the massive infrastructure of the "public key encryption" certification authorities, and the problem of conflicting legal regimes applicable to electronic signing of documents in an international or multijurisdictional setting, but nonetheless will still require the provision of a digital drawing tablet and stylus at each computer where signature is to be accomplished, as well as the related software, which can be a significant item of cost across an entire network. In addition, traditional forensic analysis applicable to handwritten signatures does not yet apply to electronic signature analysis, and it may be some time, if ever, for the legal forensic community to become adept at signature dynamics handwriting analysis. Because there is no generally accepted way at present for expert analysis of dynamic signatures, the ability to authenticate signatures from templates is arguable at best.

Furthermore, while the "signature dynamics" is claimed to allow for authentication based upon a stored template of signature characteristics, the variations in signature that occur naturally each time a signature is produced make the comparison results somewhat imperfect and correspondingly error-prone as an automatic authentication scheme:

Objects and Advantages

Accordingly, several objects and advantages of the invention are to provide a specific new type of electronic signature method that makes use of certificates issued by trusted parties but does not also depend upon a widespread distribution of private keys on client computers for signatures; nor upon certification authorities to keep track of valid and revoked certificates in real time; nor for a system of checking with respect to each individual transaction whether the certificate is still valid and reliable; further that uses only one signature key of a server which is shared by many users; and further, that can automatically generate and affix a date and time stamp of the server computer as proof of those parameters at the time of the signature.

Still further objects and advantages will become apparent from a consideration of the ensuing description and accompanying drawings.

DRAWINGS FIGURES

SUMMARY

In accordance with the present invention, a system is described for the generation of electronic signatures by multiple users from a single, shared, private key located upon a central computer of a network. Authorized users are approved for signature privileges on the basis of a unique digital certificate that has been issued to that user from one or more pieces of personal data related to the user. The user also creates a secret. The secret and the certificate give access to the signature key. A completed signature includes each user's certificate information to authenticate the individual who actually used the signature key.

Description—FIGS. 1 to 4

Figure 1:
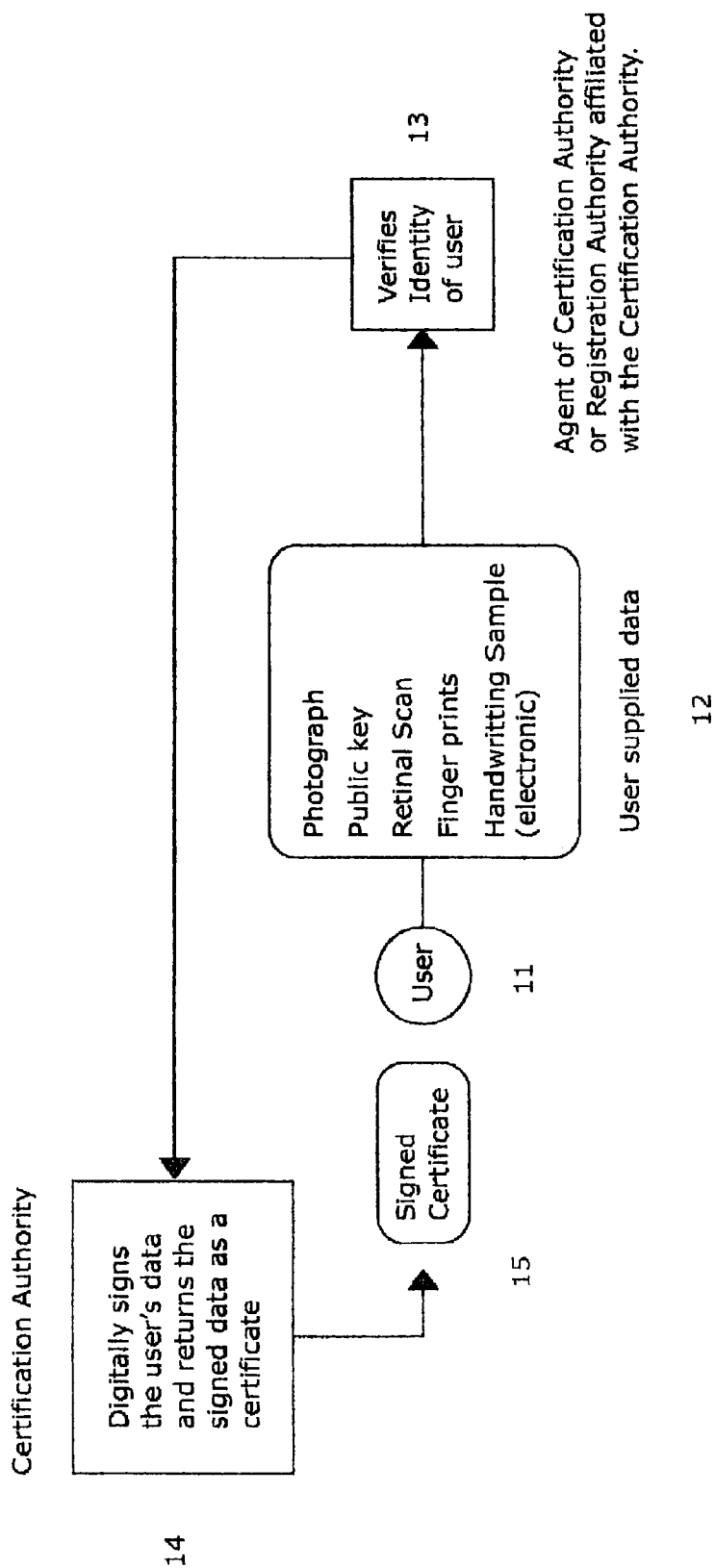
FIG. 1 shows the process of issuing a certificate from the certification authority to a user by an agent of the certification authority or a separate registration authority.

A preferred embodiment involves the Internet, and three computers: the individual's computer who wishes to sign transaction information (the user's computer), the computer that signs electronic data on behalf of users (in the preferred embodiment, an Internet server computer), and a computer that issues identification to users and controls access to the signing computer (in the preferred embodiment, this is called the certification authority). FIG. 1 depicts the initial contact between a user and the certification authority. A user (FIG. 1, no. 11) obtains a certificate from the certification authority (FIG. 1, no. 15). Personal information (FIG. 1, no. 12), is verified in person by an agent or by an independent but affiliated (with the certification authority) registration authority. (FIG. 1, no. 13) The verified data is transmitted and (FIG. 1, no. 14) signed with the private key of the certification authority. The digital certificate issued by the certification authority computer is returned to the user.

In the issuance process, the user provides one or more of the following, depending on the requirements and security policies established by the certification authority itself: a digital photograph, a commercial digital certificate, an electronic handwriting sample, an electronic fingerprint, a digital retinal scan or other biologically derived information about the user.

The user also creates a unique user secret, which may for example be a simple plaintext passphrase, or a Diffie Hellman type of shared secret. The user secret is delivered to the certification authority over a secured channel or by confidential, non-digital means. The certificate information and the user secret are stored on the certification authority computer, (FIG. 2, no. 21 and 22) which is maintained in a secure facility. The certification authority verifies the user's secret and digital certificate information at the time of signature. Only authorized users possessing both validly issued, recognized digital certificates and user secrets that are currently valid as attested to by the certification authority at the time of the transaction can create an electronic signature on the Internet server computer used to create the signatures. The user requests signature privileges. The user's certificate and unique secret, which may be encrypted for secrecy, are presented electronically to the certification authority. (FIG. 2, no. 19 and 20) If the user secret and certificate properties match those stored on the certification authority's computer, a secured message is sent to the signature server authorizing access to the private signature key. Otherwise access to the signature key is denied. (FIG. 2, no. 18)

Figure 2:
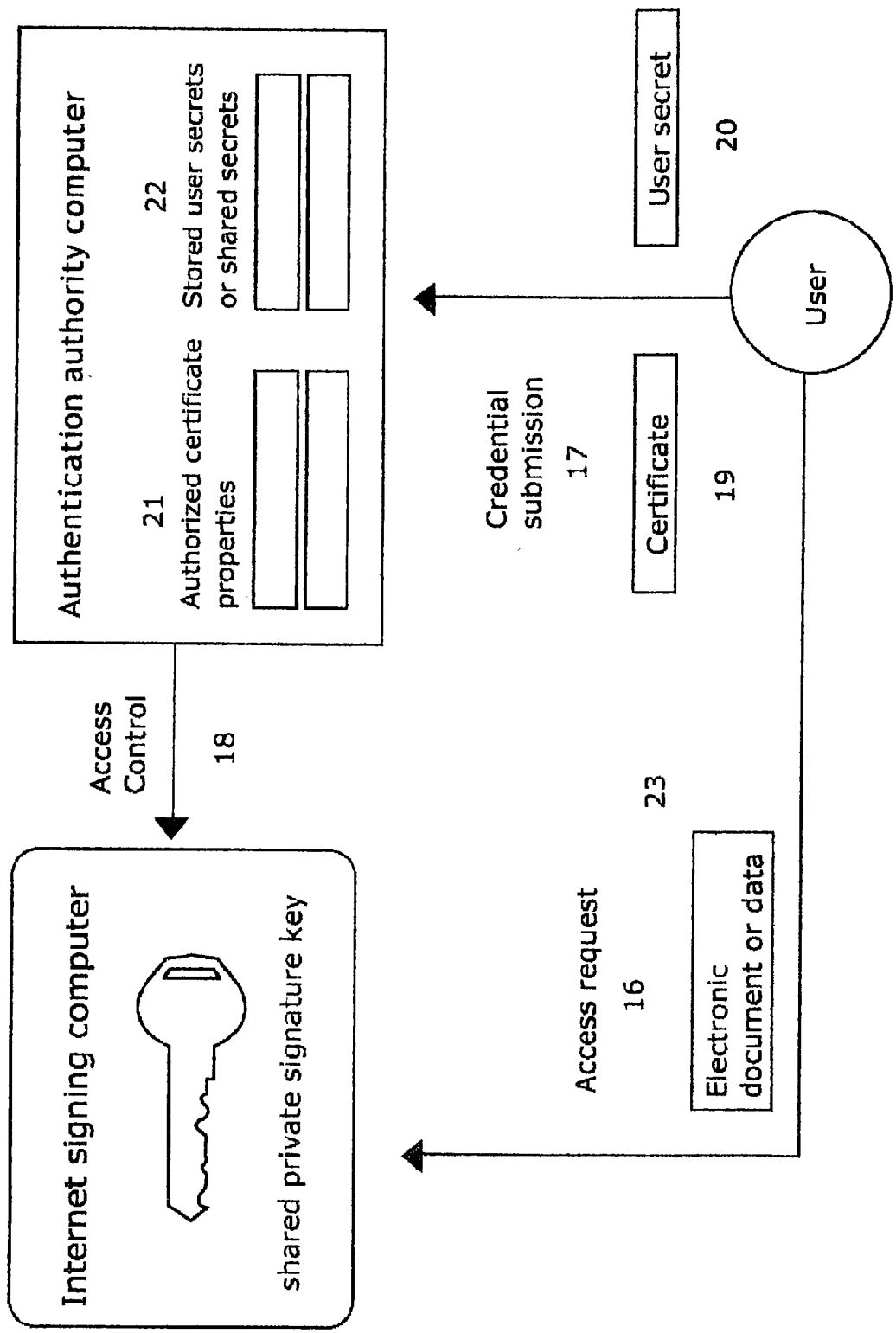
FIG. 2 shows the authentication process. A user desiring to sign a document is authenticated by the certification authority computer on the basis of both the certificate and the user's secret or shared secret.

After authentication, the digital certificate is transmitted a second time (FIG. 2, no. 23) to the server used for signatures together with the document or data to be signed (FIG. 2, no. 24). The signature mechanism may be a simple signature button that appears on a web page. FIG. 4 shows an example. Once the signature procedure is engaged, the user's certificate and the document or data to be signed is received for processing by the server, where the information presented by the user is combined with the date-time stamp of the system clock (FIG. 3, no. 25) to create a unique blend of the components. This combination also assures that a date and time stamp as well as the individual's certificate information will be included in the information that is signed by the server computer. The information is digitally signed (FIG. 3, no. 25) using the private signature key of the signature server. (FIG. 3, no. 28) Once signed, the signed document or data (FIG. 3, no. 27) cannot be changed without detection. The signed document or data is sent over the Internet or other network per instructions submitted by the user. It may be sent to another computer as an email attachment, returned to the user, or routed in any other way permitted by the network and the user's privileges.

Figure 3:
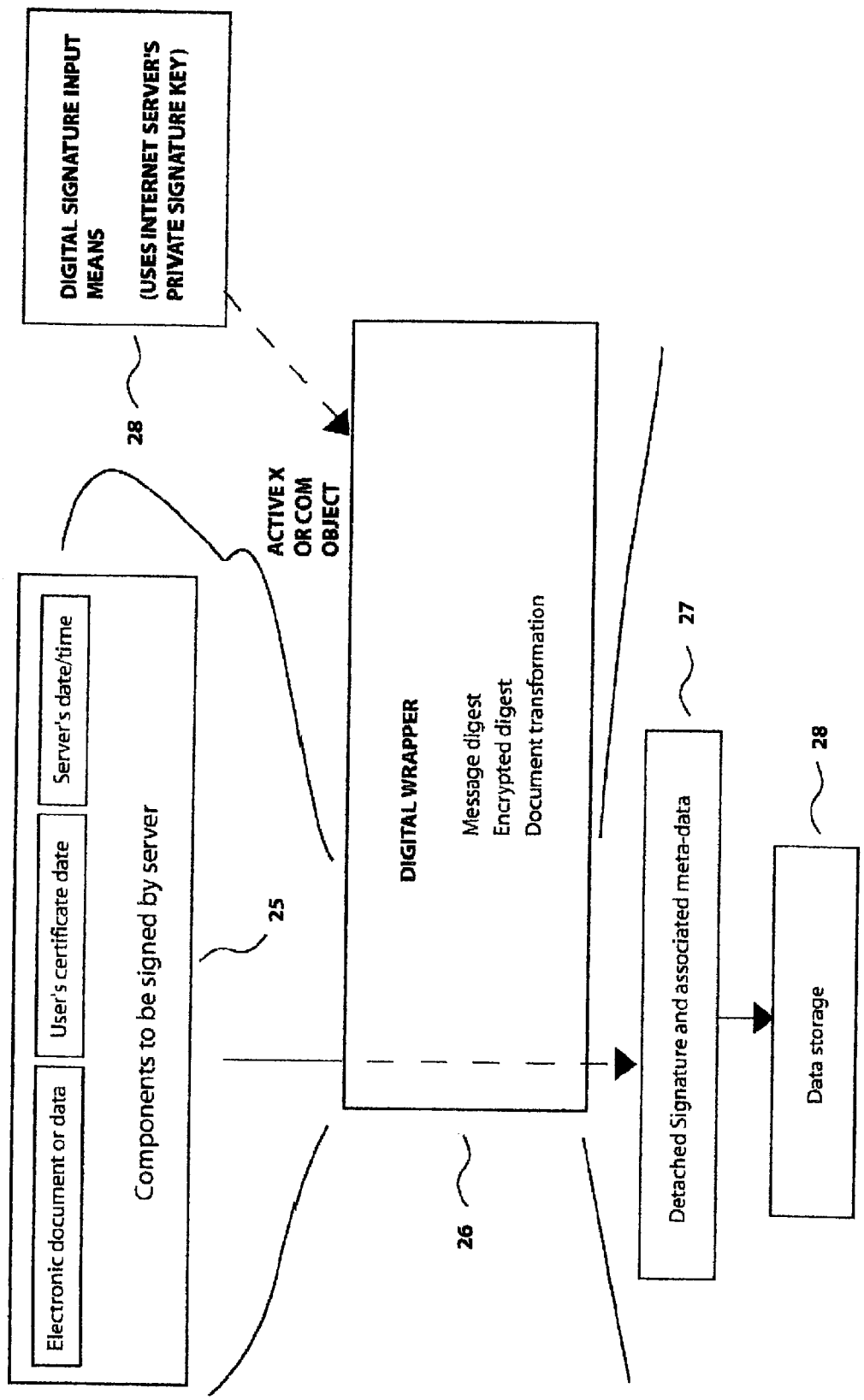
FIG. 3 shows the signature creation from the certificate information, the system clock data, the transaction data, and optionally the authentication code generated for that transaction.
Figure 4:
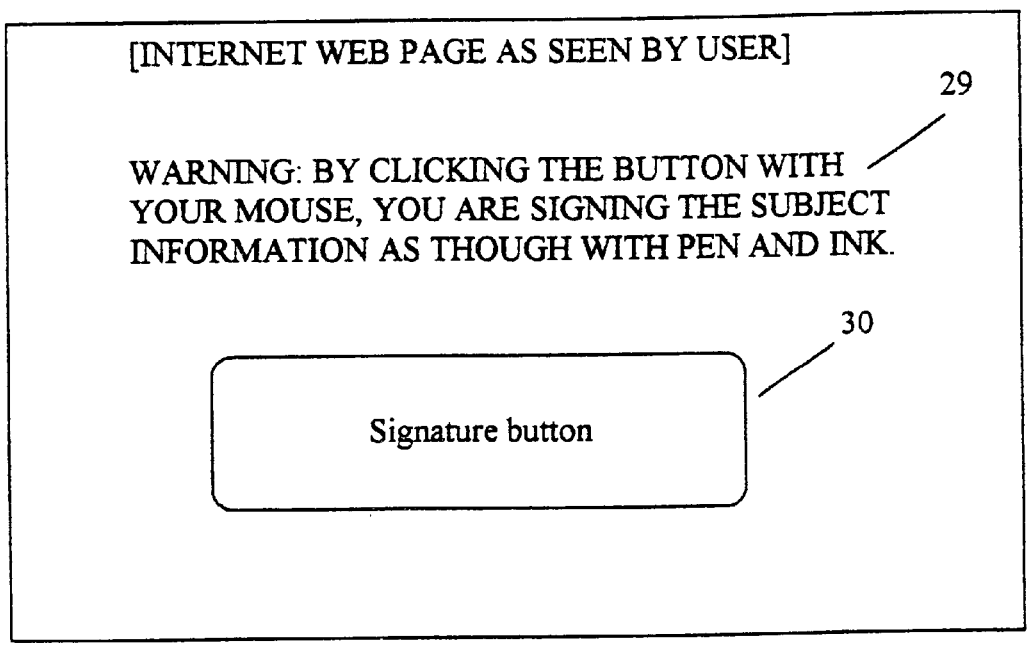
FIG. 4 is a representation of a web page as shown to the user which contains the signature button for signing the document, after signature access is granted.

FIG. 3 demonstrates how the certificate information is encapsulated in the digital signature of the server computer. An active X (com) object (no. 28) at the Internet server creates a digital wrapper (no. 26) and communicates with the signature program of the Internet server to sign the information (no. 28) contained in the signature (no. 27) with the server's private key. The certificate is thus encapsulated and digitally signed, and is included with the signed data.

Optionally, a copy of the signed information can also be included in a receipt or proof of signature which can be emailed to various locations, including the user's own email address.

The digital signature ensures that the information included in it, including document or transaction data, date and time stamp, and user's certificate cannot be altered after the fact without the change being detectable by someone possessing the signature server's public key. Inclusion of the certificate information relating to the individual who signed the document or data is inalterable proof of the identity of the signer at the time of signature, since only that user knew the secret that together with the certificate gave access to the private signature key on the signature server. Inclusion of the date and time of the signature adds an additional layer of verification.

In the preferred embodiment, unlike prior art which uses exclusively the user's own public key as a basis for the certificate, the digital certificate will also include the date and time that it was issued and may optionally include one or more of the following: a digital photograph of the user, a sample in electronic format of the user's handwriting exemplar, voice sample, retinal scan and/or fingerprint, which information is all digitally signed by the certification authority using its private key at the time that the certificate is initially issued. To the extent practicable the photograph and handwriting exemplar, if any, is printed and made available on exterior of any smart card or other housing device, for viewing and use by personnel at public facilities where identification may be requested.

FIG. 4 depicts the mechanism for actually invoking the signature device, as viewed by the user. A simple button (no. 30) is clicked by the user, coupled with a clear warning (no. 29) of the consequences of clicking the signature button. Once the button is clicked, the electronic signature mechanism is engaged.

Conclusions Ramifications, and Scope

Accordingly, it can be seen that the above system allows multiple computer users to sign electronic documents using one single private key of a shared network computer, which is accessed by each user presenting a unique passphrase and digital certificate of personalized information over the network. In addition, the digital certificate information is included in the signature itself as a means of authenticating the signer. By eliminating private signature keys on the individual computers, the system significantly reduces security concerns associated with dispersed client-side private keys, and it thereby improves and streamlines the certification authority infrastructure in support of digital signature transactions, as follows:

Personalized information of each user can be used as a basis for positively identifying the person, and not just the computer that was used to create the signature.

Three element authentication is achievable, so that the user is authenticated on the basis of something the user possesses (an individual computer or smart card containing the certificate), something the user knows (the passphrase) and something the user is (the personalized and biologically derived data optionally contained in the certificate). This is an ideal combination for authentication.

Occasional, after-the-fact authentication can be performed in the event of a questioned signature only, and not for each signature as it is received, thus reducing network load, and business overhead for certification authorities. Only a small percentage of signatures on paper documents are subjected to forensic analysis today. The bulk are presumed valid and pass without any question whatever in ordinary commerce.

Certificates can be given a relatively long life without creating unacceptable security risks, rather than relatively short expiration dates.

As certificate revocation lists diminish in importance, verification of identities on-line becomes simpler and cheaper.

Compromised passphrases are easy the quick to replace in comparison with key pairs consisting of a private and public key, the latter of which is signed by a certification authority.

The temptation to steal private keys will of individuals be rare or non-existent, because of their relative unimportance, and the complexities of assuring security of individual transactions will be greatly reduced, with resulting cost savings.

Although the description above contains much specificity, this should not be construed as limiting the scope of the invention but as merely providing illustrations of some of the presently preferred embodiments of this invention. Various other embodiments and ramifications are possible within its scope. For example, unique system information of the server can be used in addition to or instead of the system clock. Digital certificates can include a variety of information, including but not limited to a public key, or photographic, handwriting, fingerprint, voice sampling, retinal or handwriting exemplars. Although in the preferred embodiment, the certificate authentication server is separate from the Internet signature server, it is possible for the two to be combined to perform a single, integrated operation on the same server computer, or alternatively, for more than two computers to be involved in the accomplishment of the various tasks. Whatever the particular embodiment, the result is obtained without expensive additional hardware and software components, such as are necessitated by prior art.

Thus the scope of the invention should be determined by the appended claims and their legal equivalents, rather than by the examples given.

I claim:

1. A method of electronically signing one or a plurality of files, which term also includes documents and data, at a server, consisting of:

a. authenticating a user solely or partly on the basis of a digital certificate selected as suitable from a collection of types and classes of digital certificates issued by a plurality of certification authorities according to the reliability of a plurality of identification procedures to register individuals and issue to them digital certificates, in light of the authentication needs of a party or plurality of parties intending to rely upon electronic signatures to be generated at the server, and b. electronically signing at the server, comprising the following steps:

1. a presentation step of providing to the server one or a plurality of electronic files, for signature by the server computer, 2. a signature step whereby one of a plurality of computer functions returns a message digest of the electronic file or files to be signed, and a cryptotransformation of each message digest created using a key located at the server; and 3. a recording step in which the server generates and stores in a data storage medium a record of a signature transaction which includes a message digest of each electronic file and the cryptotransformation of said message digest.

2. A method of verifying an electronic signature affixed by the method of claim 1, comprising the following steps:

a. an inquiring party seeking to verify the fact and validity of a signature transmits to a server one or a plurality of electronic files, which term also includes documents and data, that are believed to have been previously signed by the server;

b. the server engages a function which returns a message digest of the electronic file or files to be verified or a cryptotransformation of each message digest using a key located at the server;

c. the server compares the results of the verification step with the stored signature data to determine if a record or a plurality of records corresponding to the transmitted signed electronic file exists in the data storage medium of such records, including with regard to a retrieved record the identity of the signer or plurality of signers and whether the returned message digest and a message digest corresponding to a previous signature transaction are identical, and where a cryptotransformation has been effected, whether a reversed cryptotransformation of the stored signature value returns the same message digest as that immediately previously obtained; and d. the server reports to the inquiring party the results derived from the determinations of the previous steps.

3. The method of claim 1 wherein authentication is associated with one, or a plurality of, biometric identifiers as represented or referenced as in one or a plurality of the certificate extension fields.

4. The method of claim 3 wherein a biometric identifier is derived from one or a plurality of the following captured biological information about a person:

i. A photograph
ii. A fingerprint
iii. A voice print
iv. A face print
v. An iris scan
vi. A digital handwriting exemplar
vii. A handprint
viii. A capillary map
ix. DNA.

* * * * *

UNITED STATES PATENT AND TRADEMARK OFFICE
CERTIFICATE OF CORRECTION

PATENT NO. : 6,745,327 B1
DATED : June 1, 2004
INVENTOR(S) : Messing, John H.

It is certified that error appears in the above-identified patent and that said Letters Patent is hereby corrected as shown below:

Replace title page with attached title page.

Delete the entire specification and insert the substitute specification

Signed and Sealed this

Twenty-fifth Day of April, 2006

JON W. DUDAS
*Director of the United States Patent and Trademark Office*

(12) United States Patent  
Messing

(10) Patent No.: US 6,745,327 B1  
(45) Date of Patent: Jun. 1, 2004

(54) ELECTRONIC CERTIFICATE SIGNATURE PROGRAM

(76) Inventor: John H. Messing, 3900 E. Broadway Blvd., Suite 201, Tucson, AZ (US) 85711

(*) Notice: Subject to any disclaimer, the term of this patent is extended or adjusted under 35 U.S.C. 154(b) by 0 days.

(21) Appl. No.: 09/244,243

(22) Filed: Feb. 3, 1999

Related U.S. Application Data

(63) Continuation-in-part of application No. 09/081,872, filed on May 20, 1998.

(51) Int. Cl.$^7$ .............................. H04L 9/32; G06F 12/14
(52) U.S. Cl. .................. 713/170; 713/156; 713/157; 713/175; 713/176; 713/182; 713/185
(58) Field of Search .......................... 713/156, 157, 713/159, 168, 170, 173, 175, 176, 182, 178, 181, 183, 184, 185, 186; 705/51, 64, 65, 67, 68, 69, 39

(56) References Cited

U.S. PATENT DOCUMENTS

| | | | |
|---|---|---|---|
| 4,405,829 A | 9/1983 | Rivest et al. | 178/22.1 |
| 5,231,668 A | 7/1993 | Kravitz | 380/28 |
| 5,465,299 A | 11/1995 | Matsumoto et al. | 380/23 |
| 5,588,061 A | 12/1996 | Ganesan et al. | 380/30 |
| 5,613,012 A | 3/1997 | Hoffman et al. | 382/115 |
| 5,647,017 A | 7/1997 | Smithies et al. | 382/119 |
| 5,659,616 A | 8/1997 | Sudia | 380/23 |
| 5,689,567 A | 11/1997 | Miyauchi | 380/25 |
| 5,862,223 A | 1/1999 | Walker et al. | 380/25 |
| 6,029,150 A * | 2/2000 | Kravitz | 705/39 |
| 6,175,921 B1 | 1/2001 | Rosen | 713/173 |
| 6,237,096 B1 * | 5/2001 | Bisbee et al. | 705/51 |
| 6,247,644 B1 * | 6/2001 | Horne et al. | 235/380 |
| 6,253,322 B1 | 6/2001 | Susaki et al. | 713/170 |
| 6,408,336 B1 * | 6/2002 | Schneider et al. | 709/229 |

FOREIGN PATENT DOCUMENTS

GB 2237672 A * 5/1991 ........... A61B/5/117

OTHER PUBLICATIONS

Baum and Ford, Secure Electronic Commerce (1997), pp. 319–321, 330–3 and accompanying endnote 35 at p. 352.

Newman and Smithies, "Questioned *Electronic*Document Examination", PenOp & American Academy of Forensic Sciences (Feb. 1997), pp. 1–8.

Benjamin Wright, "The Legality of the PenOp® Signature", Pen Op (1994) pp. 1–8.

Gail L. Grant, "Digital Signature Technology", *Understanding Digital Signatures* (McGraw Hill 1998), Appendix II, pp. 235–243.

Cotter and Messing, "Electronic Court Filing in the Pima County Small Claims Court—Technical Parameters, Adopted Solutions and Some of the Legal Issues Involved," 38 Jurimetrics J. 397–406 (1998).

* cited by examiner

*Primary Examiner*—Justin T. Darrow

(57) ABSTRACT

An electronic certificate signature program to create electronic signatures for documents, filings, and commercial transactions effectuated over the Internet, other computer networks or by other transmission means. A digital certificate is issued to a computer user after a personal identity verification. The personalized digital certificate may include biometric data, such as a photograph, a retinal scan, a voice print, a fingerprint, a handwriting exemplar, or other biologically derived data, and a date and time stamp, all of which is digitally signed using the private key of the issuing computer. If a hardware token is employed to house the certificate, some or all of the biometric data is printed on the exterior. A digital signature is effectuated using a network computer's private key. A user presents the digital certificate and enters a unique passphrase or other identifying secret to gain access. The signature on the electronic document or data incorporates certain of the certificate information and a date and time stamp. This method positively authenticates the user. Multiple users may share the same private key of a network computer using this method. Individual private signature keys are not employed.

4 Claims, 4 Drawing Sheets

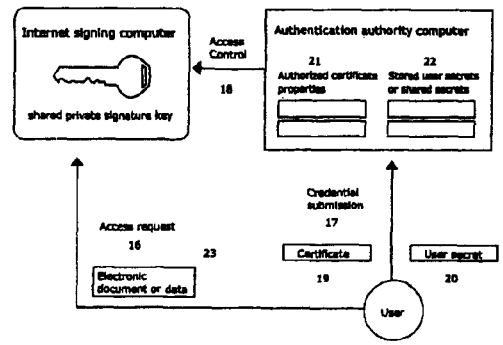

ELECTRONIC CERTIFICATE SIGNATURE PROGRAM

CROSS REFERENCES TO RELATED APPLICATIONS

This is a continuation-in-part of Ser. No. 09/081,872, filed May 20, 1998.

BACKGROUND

1. Field of Invention

This invention allows multiple users to access a single signature device located on a central network computer by typing a unique passphrase known only to the individual user and/or presenting a digital certificate that contains personal data about the individual user and to sign using the certificate information which is also incorporated into the signature itself as a way to authenticate the user in connection with the signed electronic document or data.

2. Description of Prior Art

The dominant technology under prior art for individuals to sign electronic documents and transaction data is based upon client-side digital signatures. The signatures are created by software that uses an encryption algorithm, called a private key, of the user to electronically encode the electronic document or transaction data. A mathematically related algorithm, called the public key corresponds to the private signature key. The public key is used by the recipient to verify the authenticity of the electronic document or data and the integrity of the data since signing occurred, including the fact that it has not been changed or altered since the signature was affixed. Digital certificates issued by trusted third parties called certification authorities identify public keys of the presumptive true owners of the private keys that were used for signing, thus assuring that the signer is in fact the person who purported to sign the document or data.

An example of a system of digital signatures is shown in U.S. Pat. No. 4,405,829 to Rivest et al. (1983). It is based upon a technology commonly referred to as "asymmetric encryption." In this technology, a user generates two mathematically related numbers based upon prime numbers, called keys. The so-called private key remains with the issuing user. It is kept secret. The other key, denominated the public key, can be freely distributed by the issuer to others. The keys are related, but they are not identical. They perform reverse roles. One is used to encrypt information, and the other to decrypt it. With respect to signatures, one key affixes the signature and other is used to verify it and the electronic document contents.

Electronic communications are signed, generally with the private key, in a two step process. First a digest of a message is created with a one way hash function, and then the hash function is encrypted using the private key. The authenticity of the message and its contents can be verified by a recipient as being authentic and sent from the signing party by testing the message using the public key. An altered message or fraudulent sender will be detected by a computer possessing the proper software and the public key. If either the message has been altered since signing or alternatively the signer did not use the proper private key, the signature will be reported as false or inauthentic. This method is useful for electronic authentication.

Signatures under prior art may be enveloping, enveloped or detached. A detached signature consists of a separate file containing the encrypted message digest of the signed file or data, whereas the enveloping or enveloped signature become part of the same file as the signed document or data. When located in the same computer directory as the signed file or data, and accessed using the appropriate encryption key, the detached signature can be used to determine signature verification equally with the other types of digital signatures. With a detached signature, the file or data itself remains unmodified despite the signature process.

However, a detached signature, because it is separate from the signed file or data can be lost to the user. If lost, signature verification becomes impossible, even if the appropriate encryption key is available.

With prior art, users are identified to others through a system of digital certificates issued by trusted third parties, called certification authorities. These certification authorities verify the identities of individual key holders before issuing certificates to them. Once identity is confirmed, they sign the public key of the individual with the certification authority's private key. They also allow others to verify that the public key of the key pair belongs to the party who is identified as the holder of the key pair, and maintain lists of active and revoked certificates for use by third parties that rely upon the certificates to prove identity. Authentication by a relying party requires not only a check of the digital signature on the message, but also of the status of the certificate identifying the signer, to make sure that it is still valid. This involves accessing the certification authority computer and checking its lists of revoked and suspended certificates. The investment to create and operate a commercial or large enterprise-wide certification authority is considerable. Legal requirements of periodic audits impose other costs.

The digital certificates from certification authorities identify the owner of the key pair principally through the owner's public key that was signed by the certification authority at the time of issue. No other identification is made part of the certificate—no picture identification, fingerprint identification, handwriting exemplar, voice print, finger print, retinal scan, or other additional proof in the certificate of the owner's personal identity. Without such other proof as part of the certificate itself, there is no personal identification of the owner to protect the certificate from subsequent wrongful use. An identity check is performed by the certification authority at the time that the public key is signed, but not afterwards. This makes it possible for an unauthorized person who comes into possession of the private key and the certificate of another to claim the identity of the true owner for purposes of one or more transactions over the Internet. The assumed identity can continue until the wrongful use is discovered and the certificate is revoked by the certification authority. Under the laws of many states, the true owner could be bound to a transaction involving wrongful certificate use up to the moment of certificate revocation because there is no other proof of identity needed or required to complete a transaction other than possession of the private key that corresponds to the public key which was signed by the certification authority. This risk is usually placed upon the key owner by contractual agreement, governing law, or custom, and may be protected against by insurance or warranty coverage.

A certification authority infrastructure requires a massive investment in equipment and personnel that results in a relatively high cost to the user. The certification authority keeps track of the current status of the public keys that have been signed by it. Each public key corresponds to a private key that may be employed on the client computer for signature purposes.

The system is also particularly awkward for business enterprises. In the event of the compromise of a private key of an employee, all correspondents, including customers, must be alerted and replace that employee's corresponding public key with the new one in order to be able to continue to verify the signed messages. This can be viewed as an annoyance or bother inappropriate for a business context. When employees leave, the employee certificates for signing that were issued by a certification authority on behalf of the enterprise must also be revoked so that the authority contained in the certificate is no longer valid.

On a broader scale, because the integrity of the entire system of this prior art rests upon the private key and certificate of the certification authority, certificates issued by different certification authorities may not be interoperable with each other. To achieve interoperability, cross-certification is sometimes attempted. This technique involves each certification authority mutually issuing a certificate to each other which names the other as a subject of the certificate. In theory, all dependent certificates issued in the chain from each certification authority will now be recognized by the cross-certifying partner's users as though derived from the cross-certifying entity. The process of cross-certification is extremely expensive both technically and legally. Without cross-certification, users of digital certificates issued by one certification authority cannot verify the signatures affixed by users of another unrelated certification authority.

Furthermore, unless suitable means are adopted by the certification authority to verify the true identity of a holder of a private key in the first place, the claimed security of all subsequent transactions involving the issued certificate is questionable. If less than thorough identity checks are initially made, the true identity of the key holder may be in doubt. As of the date of this application, there is no agreed upon legal procedure or standard for certification authorities, their agents, or registration authorities affiliated with the certification authorities to follow in making initial identity checks for purposes of issuing digital certificates to computer users.

Certificates intentionally have a limited life-span. At the end of the cycle, even if the private key has not already been compromised, a new certificate is required. This is done for security reasons. Documents that were properly signed and verified during the life-cycle of the certificate will no longer verify properly after expiration of the certificate, which is a possible source of confusion and inconvenience.

There are also significant liability issues which can arise from the need for prompt notice to potential relying third parties from the certification authority of compromised or revoked client-side signature certificates. If such notice is not correctly given, a third party who relies upon a compromised private key may have a legal cause of action against the responsible certification authority for damages, costs and attorney's fees incurred. This liability cannot be limited by contract in certain jurisdictions.

A widespread proliferation of private keys among individual computer users for electronic commerce is a basic tenet of the prior art. This creation and dispersion of private keys creates an administrative and legal tangle for those charged with keeping track of the corresponding public keys and the certificates which prove ownership of them.

So long as the private key of the individual gives practically unrestricted power to bind the individual to a transaction, there will be a temptation among hackers and others to gain unauthorized control of one or more individual's private keys. Once in their possession, the unauthorized users may be able successfully to utilize the private key of the true owner for any signature purpose, because the private key and digital certificate associated with the corresponding public key are the presumptive indicia of personal identity for affixing signatures.

Another example of prior art, PenOp, U.S. Pat. No. 5,554,255 (1994), and continuation Ser. No. 298,991, U.S. Pat. No. 5,647,017 (1997) and related patents cited therein, adopts a completely different approach to electronic signatures. It uses a digital drawing tablet as a basis for digitally capturing the characteristics across the drawing tablet of a handwritten signature in addition to the image of the signature itself. In certain applications, the software identifies the characteristic dynamic movements of the writer's hand across the tablet during repeated signature creation and stores them as a template which identifies the common signature characteristics of the series of such signatures. This stored information is later used for comparison purposes to identify a subsequently generated signature as authentic.

If a hash function is also used, digested, and linked to the signature, this approach, like the "digital signature" approach of the "asymmetric encryption" can also determine whether any changes have been made to the document since the signature was applied.

This "signature dynamics" approach may avoid the massive infrastructure of the "public key encryption" certification authorities, but nonetheless will still require the provision of a digital drawing tablet and stylus at each computer where signature is to be accomplished, as well as the related software, which can be a significant item of cost across an entire network. In addition, traditional forensic analysis applicable to handwritten signatures does not yet apply to electronic signature analysis, and it may be some time, if ever, for the legal forensic community to become adept at signature dynamics handwriting analysis. Because there is no generally accepted way at present for expert analysis of dynamic signatures, the ability to authenticate signatures from templates is arguable at best.

Furthermore, while the "signature dynamics" is claimed to allow for authentication based upon a stored template of signature characteristics, the variations in signature that occur naturally each time a signature is produced make the comparison results somewhat imperfect and correspondingly error-prone as an automatic authentication scheme.

OBJECTS AND ADVANTAGES

Accordingly, several objects and advantages of the invention are to provide a specific new type of electronic signature method that can make use of certificates issued by trusted parties but does not also depend upon a widespread distribution of private keys on client computers for signatures; nor upon certification authorities to cross-certify in order to verify signatures of each others' users; which enables a system of checking with respect to each individual transaction whether the certificate from a particular certification authority is suitable for the purposes of authenticating signers based upon the needs of relying parties to establish non-repudiation; further that uses only one signature key of a server which is shared by many users; and further, that can automatically generate and affix a date and time stamp generated or obtained by the server computer as proof of those parameters at the time of the signature.

Still further objects and advantages will become apparent from a consideration of the ensuing description and accompanying drawings.

DRAWINGS FIGURES

FIG. 1 shows the process of issuing a certificate from the certification authority to a user by an agent of the certification authority or a separate registration authority. The certificate optionally may provide a representation or reference to biometric data about the user contained in the certificate's extensions.

FIG. 2 shows the authentication process. A user desiring to sign a document is authenticated by the authentication authority computer on the basis of an authentication certificate, with or without biometric data being referenced or represented, and/or the user's secret or shared secret. Access to the key is granted. A document is provided to the server for signature. Verification is similar except that access control of users is optional.

FIG. 3 shows the signature creation using the preferred embodiment of a certificate authentication from the certificate information, the system clock data, and the document or data to be signed. A message digest and detached digital signature of the document or data are generated, which are associated with authentication information about the signer, the file name, the date and time, and are stored as one signature transaction record.

FIG. 4 is a representation of a web page as shown to the user which contains the signature button for signing the document, after signature access is granted.

SUMMARY

In accordance with the present invention, a system is described for the generation of electronic signatures by multiple users from a single, shared, private key located upon a central computer of a network. Authorized users are approved for signature privileges on the basis of a unique digital certificate that has been issued to that user from one or more pieces of personal data related to the user. In one embodiment, biometric data is referenced or represented. The user also creates a secret. The secret and/or the certificate give access to the signature key. In the preferred embodiment, a completed signature includes each user's certificate information to authenticate the individual who actually used the signature key. The detached digital signatures are stored together with the authentication information and other signature meta-data, as is set forth below.

Description—FIGS. 1 to 4

A preferred embodiment involves the Internet, and three computers: the individual's computer who wishes to sign transaction information (the user's computer), the computer that signs electronic data on behalf of users (in the preferred embodiment, an Internet server computer), and a computer that authenticates users and controls access to the signing computer (in the preferred embodiment, this is called the authentication authority). FIG. 1 depicts the initial contact between a user and a certification authority. A user (FIG. 1, no. 11) obtains a certificate from the certification authority (FIG. 1, no. 15). Personal information (FIG. 1, no. 12), is verified in person by an agent or by an independent but affiliated (with the certification authority) registration authority. (FIG. 1, no. 13).The verified data is transmitted and (FIG. 1, no. 14) signed with the private key of the certification authority. The digital certificate issued by the certification authority computer is returned to the user.

In the issuance process of one embodiment, the user provides one or more of the following, depending on the requirements and security policies established by the certification authority itself: a digital photograph, a commercial digital certificate, an electronic handwriting sample, an electronic fingerprint, a digital retinal scan or other biologically derived information about the user. The information may be encoded and included in a certificate extension field as an object identifier (OID) or a reference to a Uniform Resource Identifier (URI).

The user also creates a unique user secret, which may for example be a simple plaintext passphrase, or an encrypted shared secret. The user's secret is delivered to the authorization authority over a secured channel. The properties of certificates from approved certification authorities as referenced in the certificate extensions fields, and the user secrets are stored on the authentication authority computer, (FIG. 2, no. 21 and 22) which is maintained in a secure facility. The authentication authority verifies the user's secret and/or digital certificate information at the time of signature. Only authorized users possessing validly issued, recognized digital certificates from certification authorities who have used approved methods for identifying users and issuing certificates to them, and/or user secrets, that are currently valid as attested to by the authorization authority at the time of the transaction can create an electronic signature on the Internet server computer used to create the signatures. The user requests signature privileges. The user's certificate and/or unique secret, which may be encrypted for secrecy, are presented electronically to the authentication authority. (FIG. 2, no. 19 and 20) If the user secret and/or certificate properties of approved certificates that are currently valid match those stored on the authentication authority's computer, a document presented to the signature server (FIG. 2, no. 23) is signed upon approved access to the private signature key. Otherwise access to the signature key is denied. (FIG. 2, no. 18).

For verification purposes a signed document is transmitted a second time (FIG. 2, no. 23) to the server. A message digest of the document is extracted which is used to match the message digest of the record or records of signature transactions. The encrypted digital signature information in the signature transaction record is accessed and decrypted. If the current message digest and decrypted message digest of the stored digital signature match, the document is verified as unchanged since signature, the signature transaction record is authentic and not tampered with, and the associated authentication information is provided to the user.

The signature mechanism may be a simple signature button that appears on a web page. FIG. 4 shows an example. Once the signature procedure is engaged, the properties of the user's certificate and the document or data to be signed is received for processing by the server, where the information presented by the user is combined with the date-time stamp of the system clock (FIG. 3, no. 25) to create a unique blend of the components. This combination also assures that a date and time stamp as well as the individual's certificate information will be included in the information that is signed by the server computer. The information is digitally signed (FIG. 3, no. 25) using the private signature key of the signature server. (FIG. 3, no. 28) Once signed, the signed document or data (FIG. 3, no. 27) cannot be changed without detection. The signed document or data is sent over the Internet or other network per instructions submitted by the user. It may be sent to another computer as an email attachment, returned to the user, or routed in any other way permitted by the network and the user's privileges.

FIG. 3 demonstrates how the certificate information is captured in the digital signature of the server computer. An active X (com) object (no. 28) at the Internet server acts as a digital wrapper (no. 26) which results when the active X component communicates with the signature program of the Internet server to sign the presented information (no. 28) for signature (no. 27) with the server's private key. The authentication information of the certificate is thus captured and associated with the digitally signed document, and is available as part of the signature metadata. Optionally, a copy of the signature metadata can also be included in a receipt or proof of signature which can be emailed to various locations, including the user's own email address, or included as elements and attributes in a transmitting envelope with a crytpotransformation of the signed document or a code base64 representation of it.

The digital signature ensures that document or data cannot be altered after the fact without the change being detectable by an operation involving the signature server's public key. Inclusion of the certificate or other authentication information relating to the individual who signed the document or data is associated proof of the identity of the signer at the time of signature, since only that user knew the secret that alone or together with the certificate gave access to the private signature key on the signature server. Inclusion of the date and time of the signature adds an additional layer of verification.

In the preferred embodiment, unlike prior art which uses exclusively the user's own public key as a basis for the certificate, the digital certificate signature metadata will also include certificate extension information required as part of the authentication process and may optionally include a representation or reference to a representation of one or more of the following: a digital photograph of the user, a sample in electronic format of the user's handwriting exemplar, voice sample, retinal scan and/or fingerprint, which information is all digitally signed by the certification authority using its private key at the time that the certificate is initially issued. To the extent practicable the photograph and handwriting exemplar, if any, is printed and made available on exterior of any smart card or other housing device, for viewing and use by personnel at public facilities where identification may be requested.

FIG. 4 depicts the mechanism for actually invoking the signature device, as viewed by the user. A simple button (no. 30) is clicked by the user, coupled with a clear warning (no. 29) of the consequences of clicking the signature button. An optional choice to exit the page in order to avoid signature may be provided. Once the signature button is clicked, the electronic signature mechanism is engaged.

CONCLUSIONS, RAMIFICATIONS, AND SCOPE

Accordingly, it can be seen that the above system allows multiple computer users to sign electronic documents using one single private key of a shared network computer, which is accessed by each user presenting a unique passphrase and/or digital certificate of personalized information over the network. In addition, the digital certificate or other authentication information is included in the signature itself as a means of authenticating the signer. By eliminating private signature keys on the individual computers, the system significantly reduces security concerns associated with dispersed client-side private keys, and it thereby improves and streamlines the certification authority infrastructure in support of digital signature transactions, as follows:

Personalized information of each user can be used as a basis for positively identifying the person, and not just the computer that was used to create the signature.

Multi-element authentication is achievable, so that the user is authenticated on the basis of something the user possesses (an individual computer or smart card containing the certificate), something the user knows (the passphrase) and/or something the user is (the personalized and biologically derived data optionally contained in the certificate). This is a superior combination for authentication.

Only approved certificates as identified by information contained in certificate extension fields are allowed access by the authentication authority, which enables maintaining quality control over the certificate issuance process on behalf of relying parties.

The authentication authority can accept otherwise incompatible certificates for access to the private signature key of the signature server that could not without cross-certification be used mutually to sign and verify signatures on behalf of certificate holders absent this invention.

Use of an authentication authority to control access to the signature server enables one individual to sign for another person or entity based upon a limited grant of authority, to restrict computationally the allowed signature transactions to those within the grant of authority, and revoke the grant of authority by instructions to the authentication authority server without the issuance of additional attribute certificates as under prior art.

The authentication authority can perform certification revocation checks with regard to certificates presented by signors without requiring other such checks by or on behalf of relying parties, who may not be aware of the need for or techniques to accomplish them or bother to use them.

Although the description above contains much specificity, this should not be construed as limiting the scope of the invention but as merely providing illustrations of some of the presently preferred embodiments of this invention. Various other embodiments and ramifications are possible within its scope. For example, unique system information of the server can be used in addition to or instead of the system clock. Digital certificates can include a reference or representation of a variety of information, including but not limited to a public key, or photographic, handwriting, fingerprint, voice sampling, retinal or handwriting exemplars. Although in the preferred embodiment, the authentication server is separate from the Internet signature server, it is possible for the two to be combined to perform a single, integrated operation on the same server computer, or alternatively, for more than two computers to be involved in the accomplishment of the various tasks. Whatever the particular embodiment, the result is obtained without expensive additional hardware and software components, such as are necessitated by prior art.

Thus the scope of the invention should be determined by the appended claims and their legal equivalents, rather than by the examples given.

I claim:

1. A method of electronically signing one or a plurality of files, which term also includes documents and data, at a server, consisting of:

a. authenticating a user solely or partly on the basis of a digital certificate selected as suitable from a collection of types and classes of digital certificates issued by a plurality of certification authorities according to the reliability of a plurality of identification procedures to register individuals and issue to them digital certificates, in light of the authentication needs of a party or plurality of parties intending to rely upon electronic signatures to be generated at the server, and b. electronically signing at the server, comprising the following steps:
1. a presentation step of providing to the server one or a plurality of electronic files, for signature by the server computer;
2. a signature step whereby one of a plurality of computer functions returns a message digest of the electronic file or files to be signed, and a cryptotransformation of each message digest created using a key located at the server; and
3. a recording step in which the server generates and stores in a data storage medium a record of a signature transaction which includes a message digest of each electronic file and the cryptotransformation of said message digest.

2. A method of verifying an electronic signature affixed by the method of claim 1, comprising the following steps:
a. an inquiring party seeking to verify the fact and validity of a signature transmits to a server one or a plurality of electronic files, which term also includes documents and data, that are believed to have been previously signed by the server;
b. the server engages a function which returns a message digest of the electronic file or files to be verified or a cryptotransformation of each message digest using a key located at the server;
c. the server compares the results of the verification step with the stored signature data to determine if a record or a plurality of records corresponding to the transmitted signed electronic file exists in the data storage medium of such records, including with regard to a retrieved record the identity of the signer or plurality of signers and whether the returned message digest and a message digest corresponding to a previous signature transaction are identical, and where a cryptotransformation has been effected, whether a reversed cryptotransformation of the stored signature value returns the same message digest as that immediately previously obtained; and
d. the server reports to the inquiring party the results derived from the determinations of the previous steps.

3. The method of claim 1 wherein authentication is associated with one, or a plurality of, biometric identifiers as represented or referenced as in one or a plurality of the certificate extension fields.

4. The method of claim 3 wherein a biometric identifier is derived from one or a plurality of the following captured biological information about a person:
i. A photograph
ii. A fingerprint
iii. A voice print
iv. A face print
v. An iris scan
vi. A digital handwriting exemplar
vii. A handprint
viii. A capillary map
ix. DNA.

* * * * *

UNITED STATES PATENT AND TRADEMARK OFFICE
CERTIFICATE OF CORRECTION

PATENT NO. : 6,745,327 B1
DATED : June 1, 2004
INVENTOR(S) : Messing, John H.

It is certified that error appears in the above-identified patent and that said Letters Patent is hereby corrected as shown below:

Delete the title page and insert the attached title page.

Delete the entire specification and insert the attached specification.

Signed and Sealed this

Sixth Day of June, 2006

JON W. DUDAS
*Director of the United States Patent and Trademark Office*

(12) United States Patent
Messing

(10) Patent No.: US 6,745,327 B1
(45) Date of Patent: Jun. 1, 2004

(54) ELECTRONIC CERTIFICATE SIGNATURE PROGRAM

(76) Inventor: John H. Messing, 3900 E. Broadway Blvd., Suite 201, Tucson, AZ (US) 85711

( * ) Notice: Subject to any disclaimer, the term of this patent is extended or adjusted under 35 U.S.C. 154(b) by 0 days.

(21) Appl. No.: 09/244,243

(22) Filed: Feb. 3, 1999

Related U.S. Application Data

(63) Continuation-in-part of application No. 09/081,872, filed on May 20, 1998.

(51) Int. Cl.$^7$ .............................. H04L 9/32; G06F 12/14
(52) U.S. Cl. ...................... 713/170; 713/156; 713/157; 713/175; 713/176; 713/182; 713/185
(58) Field of Search .................................. 713/156, 157, 713/159, 168, 170, 173, 175, 176, 182, 178, 181, 183, 184, 185, 186; 705/51, 64, 65, 67, 68, 69, 39

(56) References Cited

U.S. PATENT DOCUMENTS

| | | | |
|---|---|---|---|
| 4,405,829 A | 9/1983 | Rivest et al. | 178/22.1 |
| 5,231,668 A | 7/1993 | Kravitz | 380/28 |
| 5,465,299 A | 11/1995 | Matsumoto et al. | 380/23 |
| 5,588,061 A | 12/1996 | Ganesan et al. | 380/30 |
| 5,613,012 A | 3/1997 | Hoffman et al. | 382/115 |
| 5,647,017 A | 7/1997 | Smithies et al. | 382/119 |
| 5,659,616 A | 8/1997 | Sudia | 380/23 |
| 5,689,567 A | 11/1997 | Miyauchi | 380/25 |
| 5,862,223 A | 1/1999 | Walker et al. | 380/25 |
| 6,029,150 A * | 2/2000 | Kravitz | 705/39 |
| 6,175,921 B1 | 1/2001 | Rosen | 713/173 |
| 6,237,096 B1 * | 5/2001 | Bisbee et al. | 705/51 |
| 6,247,644 B1 * | 6/2001 | Horne et al. | 235/380 |
| 6,253,322 B1 | 6/2001 | Susaki et al. | 713/170 |
| 6,408,336 B1 * | 6/2002 | Schneider et al. | 709/229 |

FOREIGN PATENT DOCUMENTS

GB 2237672 A * 5/1991 .......... A61B/5/117

OTHER PUBLICATIONS

Baum and Ford, Secure Electronic Commerce (1997), pp. 319–321, 330–3 and accompanying endnote 35 at p. 352.

Newman and Smithies, "Questioned *Electronic*Document Examination", PenOp & American Academy of Forensic Sciences (Feb. 1997), pp. 1–8.

Benjamin Wright, "The Legality of the PenOp® Signature", Pen Op (1994) pp. 1–8.

Gail L. Grant, "Digital Signature Technology", *Understanding Digital Signatures* (McGraw Hill 1998), Appendix II, pp. 235–243.

Cotter and Messing, "Electronic Court Filing in the Pima County Small Claims Court—Technical Parameters, Adopted Solutions and Some of the Legal Issues Involved," 38 Jurimetrics J. 397–406 (1998).

* cited by examiner

*Primary Examiner*—Justin T. Darrow

(57) ABSTRACT

An electronic certificate signature program to create electronic signatures for documents, filings, and commercial transactions effectuated over the Internet, other computer networks or by other transmission means. A digital certificate is issued to a computer user after a personal identity verification. The personalized digital certificate may include biometric data, such as a photograph, a retinal scan, a voice print, a fingerprint, a handwriting exemplar, or other biologically derived data, and a date and time stamp, all of which is digitally signed using the private key of the issuing computer. If a hardware token is employed to house the certificate, some or all of the biometric data is printed on the exterior. A digital signature is effectuated using a network computer's private key. A user presents the digital certificate and enters a unique passphrase or other identifying secret to gain access. The signature on the electronic document or data incorporates certain of the certificate information and a date and time stamp. This method positively authenticates the user. Multiple users may share the same private key of a network computer using this method. Individual private signature keys are not employed.

4 Claims, 4 Drawing Sheets

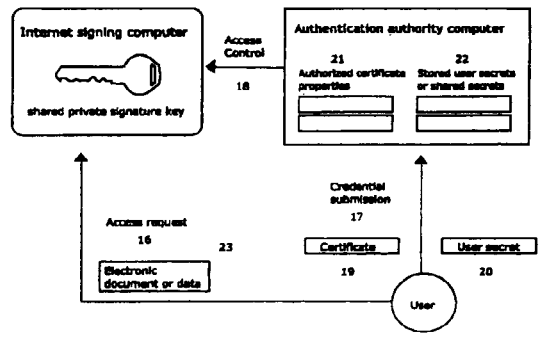

ELECTRONIC CERTIFICATE SIGNATURE PROGRAM

CROSS REFERENCES TO RELATED APPLICATIONS

This is a continuation-in-part of Ser. No. 09/081,872, filed May 20, 1998.

BACKGROUND

1. Field of Invention

This invention allows multiple users to access a single signature device located on a central network computer by typing a unique passphrase known only to the individual user and/or presenting a digital certificate that contains personal data about the individual user and to sign using the certificate information which is also incorporated into the signature itself as a way to authenticate the user in connection with the signed electronic document or data.

2. Description of Prior Art

The dominant technology under prior art for individuals to sign electronic documents and transaction data is based upon client-side digital signatures. The signatures are created by software that uses an encryption algorithm, called a private key, of the user to electronically encode the electronic document or transaction data. A mathematically related algorithm, called the public key corresponds to the private signature key. The public key is used by the recipient to verify the authenticity of the electronic document or data and the integrity of the data since signing occurred, including the fact that it has not been changed or altered since the signature was affixed. Digital certificates issued by trusted third parties called certification authorities identify public keys of the presumptive true owners of the private keys that were used for signing, thus assuring that the signer is in fact the person who purported to sign the document or data.

An example of a system of digital signatures is shown in U.S. Pat. No. 4,405,829 to Rivest et al. (1983). It is based upon a technology commonly referred to as "asymmetric encryption." In this technology, a user generates two mathematically related numbers based upon prime numbers, called keys. The so-called private key remains with the issuing user. It is kept secret. The other key, denominated the public key, can be freely distributed by the issuer to others. The keys are related, but they are not identical. They perform reverse roles. One is used to encrypt information, and the other to decrypt it. With respect to signatures, one key affixes the signature and other is used to verify it and the electronic document contents.

Electronic communications are signed, generally with the private key, in a two step process. First a digest of a message is created with a one way hash function, and then the hash function is encrypted using the private key. The authenticity of the message and its contents can be verified by a recipient as being authentic and sent from the signing party by testing the message using the public key. An altered message or fraudulent sender will be detected by a computer possessing the proper software and the public key. If either the message has been altered since signing or alternatively the signer did not use the proper private key, the signature will be reported as false or inauthentic. This method is useful for electronic authentication.

Signatures under prior art may be enveloping, enveloped or detached. A detached signature consists of a separate file containing the encrypted message digest of the signed file or data, whereas the enveloping or enveloped signature become part of the same file as the signed document or data. When located in the same computer directory as the signed file or data, and accessed using the appropriate encryption key, the detached signature can be used to determine signature verification equally with the other types of digital signatures. With a detached signature, the file or data itself remains unmodified despite the signature process.

However, a detached signature, because it is separate from the signed file or data can be lost to the user. If lost, signature verification becomes impossible, even if the appropriate encryption key is available.

With prior art, users are identified to others through a system of digital certificates issued by trusted third parties, called certification authorities. These certification authorities verify the identities of individual key holders before issuing certificates to them. Once identity is confirmed, they sign the public key of the individual with the certification authority's private key. They also allow others to verify that the public key of the key pair belongs to the party who is identified as the holder of the key pair, and maintain lists of active and revoked certificates for use by third parties that rely upon the certificates to prove identity. Authentication by a relying party requires not only a check of the digital signature on the message, but also of the status of the certificate identifying the signer, to make sure that it is still valid. This involves accessing the certificate authority computer and checking its lists of revoked and suspended certificates. The investment to create and operate a commercial or large enterprise-wide certification authority is considerable. Legal requirements of periodic audits impose other costs.

The digital certificates from certification authorities identify the owner of the key pair principally through the owner's public key that was signed by the certification authority at the time of issue. No other identification is made part of the certificate—no picture identification, fingerprint identification, handwriting exemplar, voice print, finger print, retinal scan, or other additional proof in the certificate of the owner's personal identity. Without such other proof as part of the certificate itself, there is no personal identification of the owner to protect the certificate from subsequent wrongful use. An identity check is performed by the certification authority at the time that the public key is signed, but not afterwards. This makes it possible for an unauthorized person who comes into possession of the private key and the certificate of another to claim the identity of the true owner for purposes of one or more transactions over the Internet. The assumed identity can continue until the wrongful use is discovered and the certificate is revoked by the certification authority. Under the laws of many states, the true owner could be bound to a transaction involving wrongful certificate use up to the moment of certificate revocation because there is no other proof of identity needed or required to complete a transaction other than possession of the private key that corresponds to the public key which was signed by the certification authority. This risk is usually placed upon the key owner by contractual agreement, governing law, or custom, and may be protected against by insurance or warranty coverage.

A certification authority infrastructure requires a massive investment in equipment and personnel that results in a relatively high cost to the user. The certification authority keeps track of the current status of the public keys that have been signed by it. Each public key corresponds to a private key that may be employed on the client computer for signature purposes.

The system is also particularly awkward for business enterprises. In the event of the compromise of a private key of an employee, all correspondents, including customers, must be alerted and replace that employee's corresponding public key with the new one in order to be able to continue to verify the signed messages. This can be viewed as an annoyance or bother inappropriate for a business context. When employees leave, the employee certificates for signing that were issued by a certification authority on behalf of the enterprise must also be revoked so that the authority contained in the certificate is no longer valid.

On a broader scale, because the integrity of the entire system of this prior art rests upon the private key and certificate of the certification authority, certificates issued by different certification authorities may not be interoperable with each other. To achieve interoperability, cross-certification is sometimes attempted. This technique involves each certification authority mutually issuing a certificate to each other which names the other as a subject of the certificate. In theory, all dependent certificates issued in the chain from each certification authority will now be recognized by the cross-certifying partner's users as though derived from the cross-certifying entity. The process of cross-certification is extremely expensive both technically and legally. Without cross-certification, users of digital certificates issued by one certification authority cannot verify the signatures affixed by users of another unrelated certification authority.

Furthermore, unless suitable means are adopted by the certification authority to verify the true identity of a holder of a private key in the first place, the claimed security of all subsequent transactions involving the issued certificate is questionable. If less than thorough identity checks are initially made, the true identity of the key holder may be in doubt. As of the date of this application, there is no agreed upon legal procedure or standard for certification authorities, their agents, or registration authorities affiliated with the certification authorities to follow in making initial identity checks for purposes of issuing digital certificates to computer users.

Certificates intentionally have a limited life-span. At the end of the cycle, even if the private key has not already been compromised, a new certificate is required. This is done for security reasons. Documents that were properly signed and verified during the life-cycle of the certificate will no longer verify properly after expiration of the certificate, which is a possible source of confusion and inconvenience.

There are also significant liability issues which can arise from the need for prompt notice to potential relying third parties from the certification authority of compromised or revoked client-side signature certificates. If such notice is not correctly given, a third party who relies upon a compromised private key may have a legal cause of action against the responsible certification authority for damages, costs and attorney's fees incurred. This liability cannot be limited by contract in certain jurisdictions.

A widespread proliferation of private keys among individual computer users for electronic commerce is a basic tenet of the prior art. This creation and dispersion of private keys creates an administrative and legal tangle for those charged with keeping track of the corresponding public keys and the certificates which prove ownership of them.

So long as the private key of the individual gives practically unrestricted power to bind the individual to a transaction, there will be a temptation among hackers and others to gain unauthorized control of one or more individual's private keys. Once in their possession, the unauthorized users may be able successfully to utilize the private key of the true owner for any signature purpose, because the private key and digital certificate associated with the corresponding public key are the presumptive indicia of personal identity for affixing signatures.

Another example of prior art, PenOp, U.S. Pat. No. 5,554,255 (1994), and continuation Ser. No. 298,991, U.S. Pat. No. 5,647,017 (1997) and related patents cited therein, adopts a completely different approach to electronic signatures. It uses a digital drawing tablet as a basis for digitally capturing the characteristics across the drawing tablet of a handwritten signature in addition to the image of the signature itself. In certain applications, the software identifies the characteristic dynamic movements of the writer's hand across the tablet during repeated signature creation and stores them as a template which identifies the common signature characteristics of the series of such signatures. This stored information is later used for comparison purposes to identify a subsequently generated signature as authentic.

If a hash function is also used, digested, and linked to the signature, this approach, like the "digital signature" approach of the "asymmetric encryption" can also determine whether any changes have been made to the document since the signature was applied.

This "signature dynamics" approach may avoid the massive infrastructure of the "public key encryption" certification authorities, but nonetheless will still require the provision of a digital drawing tablet and stylus at each computer where signature is to be accomplished, as well as the related software, which can be a significant item of cost across an entire network. In addition, traditional forensic analysis applicable to handwritten signatures does not yet apply to electronic signature analysis, and it may be some time, if ever, for the legal forensic community to become adept at signature dynamics handwriting analysis. Because there is no generally accepted way at present for expert analysis of dynamic signatures, the ability to authenticate signatures from templates is arguable at best.

Furthermore, while the "signature dynamics" is claimed to allow for authentication based upon a stored template of signature characteristics, the variations in signature that occur naturally each time a signature is produced make the comparison results somewhat imperfect and correspondingly error-prone as an automatic authentication scheme.

OBJECTS AND ADVANTAGES

Accordingly, several objects and advantages of the invention are to provide a specific new type of electronic signature method that can make use of certificates issued by trusted parties but does not also depend upon a widespread distribution of private keys on client computers for signatures; nor upon certification authorities to cross-certify in order to verify signatures of each others' users; which enables a system of checking with respect to each individual transaction whether the certificate from a particular certification authority is suitable for the purposes of authenticating signers based upon the needs of relying parties to establish non-repudiation; further that uses only one signature key of a server which is shared by many users; and further, that can automatically generate and affix a date and time stamp generated or obtained by the server computer as proof of those parameters at the time of the signature.

Still further objects and advantages will become apparent from a consideration of the ensuing description and accompanying drawings.

DRAWINGS FIGURES

FIG. 1 shows the process of issuing a certificate from the certification authority to a user by an agent of the certification authority or a separate registration authority. The certificate optionally may provide a representation or reference to biometric data about the user contained in the certificate's extensions.

FIG. 2 shows the authentication process. A user desiring to sign a document is authenticated by the authentication authority computer on the basis of an authentication certificate, with or without biometric data being referenced or represented, and/or the user's secret or shared secret. Access to the key is granted. A document is provided to the server for signature. Verification is similar except that access control of users is optional.

FIG. 3 shows the signature creation using the preferred embodiment of a certificate authentication from the certificate information, the system clock data, and the document or data to be signed. A message digest and detached digital signature of the document or data are generated, which are associated with authentication information about the signer, the file name, the date and time, and are stored as one signature transaction record.

FIG. 4 is a representation of a web page as shown to the user which contains the signature button for signing the document, after signature access is granted.

SUMMARY

In accordance with the present invention, a system is described for the generation of electronic signatures by multiple users from a single, shared, private key located upon a central computer of a network. Authorized users are approved for signature privileges on the basis of a unique digital certificate that has been issued to that user from one or more pieces of personal data related to the user. In one embodiment, biometric data is referenced or represented. The user also creates a secret. The secret and/or the certificate give access to the signature key. In the preferred embodiment, a completed signature includes each user's certificate information to authenticate the individual who actually used the signature key. The detached digital signatures are stored together with the authentication information and other signature meta-data, as is set forth below.

Description—FIGS. 1 to 4

A preferred embodiment involves the Internet, and three computers: the individual's computer who wishes to sign transaction information (the user's computer), the computer that signs electronic data on behalf of users (in the preferred embodiment, an Internet server computer), and a computer that authenticates users and controls access to the signing computer (in the preferred embodiment, this is called the authentication authority). FIG. 1 depicts the initial contact between a user and a certification authority. A user (FIG. 1, no. 11) obtains a certificate from the certification authority (FIG. 1, no. 15). Personal information (FIG. 1, no. 12), is verified in person by an agent or by an independent but affiliated (with the certification authority) registration authority. (FIG. 1, no. 13).The verified data is transmitted and (FIG. 1, no. 14) signed with the private key of the certification authority. The digital certificate issued by the certification authority computer is returned to the user.

In the issuance process of one embodiment, the user provides one or more of the following, depending on the requirements and security policies established by the certification authority itself: a digital photograph, a commercial digital certificate, an electronic handwriting sample, an electronic fingerprint, a digital retinal scan or other biologically derived information about the user. The information may be encoded and included in a certificate extension field as an object identifier (OID) or a reference to a Uniform Resource Identifier (URI).

The user also creates a unique user secret, which may for example be a simple plaintext passphrase, or an encrypted shared secret. The user's secret is delivered to the authorization authority over a secured channel. The properties of certificates from approved certification authorities as referenced in the certificate extensions fields, and the user secrets are stored on the authentication authority computer, (FIG. 2, no. 21 and 22) which is maintained in a secure facility. The authentication authority verifies the user's secret and/or digital certificate information at the time of signature. Only authorized users possessing validly issued, recognized digital certificates from certification authorities who have used approved methods for identifying users and issuing certificates to them, and/or user secrets, that are currently valid as attested to by the authorization authority at the time of the transaction can create an electronic signature on the Internet server computer used to create the signatures. The user requests signature privileges. The user's certificate and/or unique secret, which may be encrypted for secrecy, are presented electronically to the authentication authority. (FIG. 2, no. 19 and 20) If the user secret and/or certificate properties of approved certificates that are currently valid match those stored on the authentication authority's computer, a document presented to the signature server (FIG. 2, no. 23) is signed upon approved access to the private signature key. Otherwise access to the signature key is denied. (FIG. 2, no. 18).

For verification purposes a signed document is transmitted a second time (FIG. 2, no. 23) to the server. A message digest of the document is extracted which is used to match the message digest of the record or records of signature transactions. The encrypted digital signature information in the signature transaction record is accessed and decrypted. If the current message digest and decrypted message digest of the stored digital signature match, the document is verified as unchanged since signature, the signature transaction record is authentic and not tampered with, and the associated authentication information is provided to the user.

The signature mechanism may be a simple signature button that appears on a web page. FIG. 4 shows an example. Once the signature procedure is engaged, the properties of the user's certificate and the document or data to be signed is received for processing by the server, where the information presented by the user is combined with the date-time stamp of the system clock (FIG. 3, no. 25) to create a unique blend of the components. This combination also assures that a date and time stamp as well as the individual's certificate information will be included in the information that is signed by the server computer. The information is digitally signed (FIG. 3, no. 25) using the private signature key of the signature server. (FIG. 3, no. 28) Once signed, the signed document or data (FIG. 3, no. 27) cannot be changed without detection. The signed document or data is sent over the Internet or other network per instructions submitted by the user. It may be sent to another computer as an email attachment, returned to the user, or routed in any other way permitted by the network and the user's privileges.

FIG. 3 demonstrates how the certificate information is captured in the digital signature of the server computer. An active X (com) object (no. 28) at the Internet server acts as a digital wrapper (no. 26) which results when the active X component communicates with the signature program of the Internet server to sign the presented information (no. 28) for signature (no. 27) with the server's private key. The authentication information of the certificate is thus captured and associated with the digitally signed document, and is available as part of the signature metadata. Optionally, a copy of the signature metadata can also be included in a receipt or proof of signature which can be emailed to various locations, including the user's own email address, or included as elements and attributes in a transmitting envelope with a crytpotransformation of the signed document or a code base64 representation of it.

The digital signature ensures that document or data cannot be altered after the fact without the change being detectable by an operation involving the signature server's public key. Inclusion of the certificate or other authentication information relating to the individual who signed the document or data is associated proof of the identity of the signer at the time of signature, since only that user knew the secret that alone or together with the certificate gave access to the private signature key on the signature server. Inclusion of the date and time of the signature adds an additional layer of verification.

In the preferred embodiment, unlike prior art which uses exclusively the user's own public key as a basis for the certificate, the digital certificate signature metadata will also include certificate extension information required as part of the authentication process and may optionally include a representation or reference to a representation of one or more of the following: a digital photograph of the user, a sample in electronic format of the user's handwriting exemplar, voice sample, retinal scan and/or fingerprint, which information is all digitally signed by the certification authority using its private key at the time that the certificate is initially issued. To the extent practicable the photograph and handwriting exemplar, if any, is printed and made available on exterior of any smart card or other housing device, for viewing and use by personnel at public facilities where identification may be requested.

FIG. 4 depicts the mechanism for actually invoking the signature device, as viewed by the user. A simple button (no. 30) is clicked by the user, coupled with a clear warning (no. 29) of the consequences of clicking the signature button. An optional choice to exit the page in order to avoid signature may be provided. Once the signature button is clicked, the electronic signature mechanism is engaged.

CONCLUSIONS, RAMIFICATIONS, AND SCOPE

Accordingly, it can be seen that the above system allows multiple computer users to sign electronic documents using one single private key of a shared network computer, which is accessed by each user presenting a unique passphrase and/or digital certificate of personalized information over the network. In addition, the digital certificate or other authentication information is included in the signature itself as a means of authenticating the signer. By eliminating private signature keys on the individual computers, the system significantly reduces security concerns associated with dispersed client-side private keys, and it thereby improves and streamlines the certification authority infrastructure in support of digital signature transactions, as follows:

Personalized information of each user can be used as a basis for positively identifying the person, and not just the computer that was used to create the signature.

Multi-element authentication is achievable, so that the user is authenticated on the basis of something the user possesses (an individual computer or smart card containing the certificate), something the user knows (the passphrase) and/or something the user is (the personalized and biologically derived data optionally contained in the certificate). This is a superior combination for authentication.

Only approved certificates as identified by information contained in certificate extension fields are allowed access by the authentication authority, which enables maintaining quality control over the certificate issuance process on behalf of relying parties.

The authentication authority can accept otherwise incompatible certificates for access to the private signature key of the signature server that could not without cross-certification be used mutually to sign and verify signatures on behalf of certificate holders absent this invention.

Use of an authentication authority to control access to the signature server enables one individual to sign for another person or entity based upon a limited grant of authority, to restrict computationally the allowed signature transactions to those within the grant of authority, and revoke the grant of authority by instructions to the authentication authority server without the issuance of additional attribute certificates as under prior art.

The authentication authority can perform certification revocation checks with regard to certificates presented by signors without requiring other such checks by or on behalf of relying parties, who may not be aware of the need for or techniques to accomplish them or bother to use them.

Although the description above contains much specificity, this should not be construed as limiting the scope of the invention but as merely providing illustrations of some of the presently preferred embodiments of this invention. Various other embodiments and ramifications are possible within its scope. For example, unique system information of the server can be used in addition to or instead of the system clock. Digital certificates can include a reference or representation of a variety of information, including but not limited to a public key, or photographic, handwriting, fingerprint, voice sampling, retinal or handwriting exemplars. Although in the preferred embodiment, the authentication server is separate from the Internet signature server, it is possible for the two to be combined to perform a single, integrated operation on the same server computer, or alternatively, for more than two computers to be involved in the accomplishment of the various tasks. Whatever the particular embodiment, the result is obtained without expensive additional hardware and software components, such as are necessitated by prior art.

Thus the scope of the invention should be determined by the appended claims and their legal equivalents, rather than by the examples given.

I claim:

1. A method of electronically signing one or a plurality of files, which term also includes documents and data, at a server, consisting of:

a. authenticating a user solely or partly on the basis of a digital certificate selected as suitable from a collection of types and classes of digital certificates issued by a plurality of certification authorities according to the reliability of a plurality of identification procedures to register individuals and issue to them digital certificates, in light of the authentication needs of a party or plurality of parties intending to rely upon electronic signatures to be generated at the server, and b. electronically signing at the server, comprising the following steps:
  1. a presentation step of providing to the server one or a plurality of electronic files, for signature by the server computer,
  2. a signature step whereby one of a plurality of computer functions returns a message digest of the electronic file or files to be signed, and a cryptotransformation of each message digest created using a key located at the server; and
  3. a recording step in which the server generates and stores in a data storage medium a record of a signature transaction which includes a message digest of each electronic file and the cryptotransformation of said message digest.

2. A method of verifying an electronic signature affixed by the method of claim 1, comprising the following steps:
  a. an inquiring party seeking to verify the fact and validity of a signature transmits to a server one or a plurality of electronic files, which term also includes documents and data, that are believed to have been previously signed by the server;
  b. the server engages a function which returns a message digest of the electronic file or files to be verified or a cryptotransformation of each message digest using a key located at the server;
  c. the server compares the results of the verification step with the stored signature data to determine if a record or a plurality of records corresponding to the transmitted signed electronic file exists in the data storage medium of such records, including with regard to a retrieved record the identity of the signer or plurality of signers and whether the returned message digest and a message digest corresponding to a previous signature transaction are identical, and where a cryptotransformation has been effected, whether a reversed cryptotransformation of the stored signature value returns the same message digest as that immediately previously obtained; and
  d. the server reports to the inquiring party the results derived from the determinations of the previous steps.

3. The method of claim 1 wherein authentication is associated with one, or a plurality of, biometric identifiers as represented or referenced as in one or a plurality of the certificate extension fields.

4. The method of claim 3 wherein a biometric identifier is derived from one or a plurality of the following captured biological information about a person:
  i. A photograph
  ii. A fingerprint
  iii. A voice print
  iv. A face print
  v. An iris scan
  vi. A digital handwriting exemplar
  vii. A handprint
  viii. A capillary map
  ix. DNA.

* * * * *